(12) United States Patent
Constantine

(10) Patent No.: US 6,739,506 B1
(45) Date of Patent: May 25, 2004

(54) CREDIT CARD REFERRAL METHODS

(76) Inventor: Tommy Constantine, 7307 E. Milton Dr., Scottsdale, AZ (US) 85202

( * ) Notice: Subject to any disclaimer, the term of this patent is extended or adjusted under 35 U.S.C. 154(b) by 2 days.

(21) Appl. No.: 10/263,321

(22) Filed: Oct. 2, 2002

(51) Int. Cl.[7] .................................................. G06K 5/00
(52) U.S. Cl. ........................ 235/380; 235/379; 235/381; 235/382
(58) Field of Search ................................. 235/379, 380, 235/381, 382; 705/13, 14, 15

(56) References Cited

U.S. PATENT DOCUMENTS

| | | | | |
|---|---|---|---|---|
| 5,025,372 A | * | 6/1991 | Burton et al. ................. | 705/14 |
| 5,537,314 A | * | 7/1996 | Kanter ......................... | 705/14 |
| 6,009,415 A | * | 12/1999 | Shurling et al. ............... | 705/35 |
| 6,571,290 B2 | * | 5/2003 | Selgas et al. ................ | 709/228 |

* cited by examiner

*Primary Examiner*—Michael G. Lee
*Assistant Examiner*—Kimberly Nguyen
(74) *Attorney, Agent, or Firm*—Parsons & Goltry; Michael W. Goltry; Robert A. Parsons

(57) ABSTRACT

A method includes providing an authorized user of a credit card issued by a service provider, the authorized user referring customers to the service provider for credit card services, the customers submitting applications for credit card services to the service provider, the service provider receiving and processing and approving the applications and issuing credit cards to the customers, and in consideration therefore issuing valuable consideration to the authorized user.

17 Claims, No Drawings

CREDIT CARD REFERRAL METHODS

FIELD OF THE INVENTION

This invention relates to credit cards or bank cards and the like and, more particularly, to methods for enhancing the value of a credit card, both to a holder or user of the card and to the bank or other issuer of the card.

BACKGROUND OF THE INVENTION

Credit cards, which are devices most commonly represented by a plastic card-like member through the use of which an authorized user pays for, by way of example, services and/or merchandise and the like, have become so universally well known and ubiquitous as to have fundamentally changed the very manner in which financial transactions and dealings are viewed and conducted in society today. Such credit cards are generally issued by a bank and provide a mechanism by which a user purchases goods without an immediate, direct exchange of cash and thereby incurs debt which the user may thereafter (i.e. upon receipt of a monthly or otherwise periodic statement) either pay the outstanding balance or, as a matter of choice, defer the balance for later payment with accompanying interest or finance charges for the period during which payment of the debt is deferred.

Increasingly, credit cards are being issued by banks and the like in association with another organization such, for example, as commercial enterprises which themselves offer or sell goods and/or services. This phenomenon, known as co-branding, provides a credit card that typically carries the name of a commercial company, with the commercial company or co-branding "partner" bringing to the card holder or user added benefits which, not incidentally, assist the partner in the sale of its goods or services to the card user. Well known and successful examples of such co-branded cards include the General Motors MasterCard credit card—offering users up to a five-percent rebate on user-purchased General Motors automobiles, based on the volume of charges placed on the user's card—and airline-partnered credit cards which award the card user frequent flyer mileage on the basis of user-acrued card charges.

Current co-branded credit cards, although successful, may nevertheless lack additional actual or perceived advantages, to the user and/or to the issuer and/or commercial partner, which may perhaps otherwise be available or attainable. For example, the rapid proliferation of co-branded cards offering seemingly ever-increasing amounts or levels of user-earned "benefits" encourages individual users or subscribers to obtain multiple credit cards, by which users often correspondingly split or divide their purchases and transactions—previously charged on a single card—between a number of cards, thereby decreasing the transaction volume of each card at the expense of one or more others. Moreover, permitting users to earn awards based on purchases encourages users to incur increasing amounts of debt, at times exceeding the amount that a user is reasonably capable of repaying in a timely manner, increasing the possibility of user default with consequent damage to the bank, to the commercial partner, and/or to the organization whose goods or services were charged in the user's transactions with the card.

Accordingly, it is the principle of the invention to provide methods for enhancing the value of a substantially conventional credit card so as to enhance a user's or potential user's perception of the desirability of holding or subscribing to the card and encourage increased use of the card for its normal utility as a payment device, all without the disadvantages of the prior art.

SUMMARY OF THE INVENTION

The above problems and others are at least partially solved and the above purposes and others realized in a method that includes providing an authorized user of a credit card issued by a service provider, the authorized user referring a customer to the service provider for credit card services, the customer submitting an application for credit card services to the service provider, the service provider receiving and processing and approving the application and issuing a credit card to the customer establishing a referred authorized user of a credit card, and in consideration therefore to the authorized user issuing valuable consideration to the authorized user. The step of the customer submitting an application for credit card services to the service provider further includes the customer designating the authorized user as a referring party, such as by name, social security number, by a lettered and/or numbered code or password, or the like, provided to the authorized user by the service provider. In a preferred embodiment the valuable consideration is a monetary payment. In another embodiment, the valuable consideration is as gift such as one or more gift certificates for products and/or services, one or more free products and/or services, etc., whether provided by the service provider or other participating vendor such as a restaurant, retail concern, etc.

The invention further provides the authorized user incurring debt on the credit card. For a predetermined amount of debt incurred by the authorized user on the credit card, the method further includes the service provider submitting an entry into a sweepstakes on behalf of the authorized user, and conducting a drawing from entries of the sweepstakes, wherein the entry of the authorized user is one of the entries. The referred authorized user can participate in the foregoing method by referring a customer to the service provider for credit card services, and so on and so forth. Although it is preferred that the service provider conduct and/or provide the sweepstakes, it can be conducted by and/or provided by one or more other parties, such as with an independent lottery/sweepstakes.

The referred authorized user, who will now be referred to as a first referred authorized user, can participate in the instant method. Consistent with the foregoing, the invention further provides the first referred authorized user referring a second customer to the service provider for credit card services, the second customer submitting an application for credit card services to the service provider, the service provider receiving and processing and approving the application and issuing a credit card to the second customer establishing a second referred authorized user of a credit card, and in consideration therefore to the first referred authorized user the service provider issuing valuable consideration to the first referred authorized user. The step of the second customer submitting an application for credit card services to the service provider further includes the second customer designating the first referred authorized user as a referring party, such as by name, social security number, by a lettered and/or numbered code or password, or the like, provided to the authorized user by the service provider. The invention further provides the second referred authorized user incurring debt on the credit card. For a predetermined amount of debt incurred by the second referred authorized user on the credit card, the method further includes the service provider submitting an entry into a sweepstakes on behalf of the second referred authorized user, and conducting a drawing from entries of the sweepstakes, wherein the entry of the second referred authorized user is one of the entries. Although it is preferred that the service provider conduct and/or provide the sweepstakes, it can be conducted by and/or provided by one or more other parties, such as with an independent lottery/sweepstakes.

Another method embodiment includes providing an authorized user of a credit card issued by a service provider, the authorized user referring customers to the service provider for credit card services, the customers submitting applications for credit card services to the service provider, the service provider receiving and processing and approving the applications and issuing credit cards to the customers establishing referred authorized users of credit cards, and in consideration therefore to the authorized user issuing valuable consideration to the authorized user. The customers submitting applications for credit card services to the service provider further includes the customers designating the authorized user as a referring party, such as by name, social security number, by a lettered and/or numbered code or password, or the like, provided to the authorized user by the service provider. The valuable consideration is a monetary payment. In another embodiment, the valuable consideration is as gift such as one or more gift certificates for products and/or services, one or more free products and/or services, etc., whether provided by the service provider or other participating vendor such as a restaurant, retail concern, etc. The immediate embodiment further provides the authorized user incurring debt on the credit card. For a predetermined amount of debt incurred by the authorized user on the credit card, the method further includes the service provider submitting an entry into a sweepstakes on behalf of the authorized user, and conducting a drawing from entries of the sweepstakes, wherein the entry of the authorized user is one of the entries. The referred authorized users can participate in the foregoing method by referring customers to the service provider for credit card services as explained above, and so on and so forth. In accordance with this embodiment, it will be understood that although it is preferred that the service provider conduct and/or provide the sweepstakes, it can be conducted by and/or provided by one or more other parties, such as with an independent lottery/sweepstakes.

Yet another method embodiment includes providing an authorized user of a credit card issued by a service provider, the authorized user referring customers to the service provider for credit card services, the customers submitting applications for credit card services to the service provider, the service provider receiving and processing and approving the applications and issuing credit cards to the customers establishing referred authorized users of credit cards, and in consideration therefore to the authorized user, issuing valuable consideration to the authorized user for every predetermined number of referred authorized users of credit cards. The customers submitting applications for credit card services to the service provider further includes the customers designating the authorized user as a referring party, such as by name, social security number, by a lettered and/or numbered code or password, or the like, provided to the authorized user by the service provider. The valuable consideration is a monetary payment. In another embodiment, the valuable consideration is as gift such as one or more gift certificates for products and/or services, one or more free products and/or services, etc., whether provided by the service provider or other participating vendor such as restaurant, retail concern, etc. The invention further provides the authorized user incurring debt on the credit card. For a predetermined amount of debt incurred by the authorized user on the credit card, the method further includes the service provider submitting an entry into a sweepstakes on behalf of the authorized user, and conducting a drawing from entries of the sweepstakes, wherein the entry of the authorized user is one of the entries. The referred authorized users can participate in the foregoing method by referring customers to the service provider for credit card services, and so on and so forth. In accordance with the immediate embodiment, it is to be understood that although it is preferred that the service provider conduct and/or provide the sweepstakes, it can be conducted by and/or provided by one or more other parties, such as with an independent lottery/sweepstakes.

Consistent with the foregoing summary of various embodiments of the invention and the teachings set forth in the ensuing detailed description of preferred embodiments, which are taken together, the invention also contemplates associated method embodiments.

DETAILED DESCRIPTION OF PREFERRED EMBODIMENTS

The present invention concerns methods for enhancing the value of a substantially conventional credit card or bank card so as to enhance an authorized user's or potential user's perception of the desirability of holding or subscribing to the card and encourage increased use of the card for its normal utility as a payment device through which the user incurs debt. The invention allows authorized credit card users to earn income by referring customers to a credit card service provider and by participating in lottery/sweepstakes events by incurring specified debt. As used herein, the term "debt" is intended to collectively encompass all monetary obligations incurred by an authorized user of the card and all monies owed to the credit card service provider or issuer of the card for any and all forms of credit presently or hereinafter extendible to the user of or subscriber to the card's services such, by way of nonexclusive example, as for services and merchandise purchases, cash advances or loans, subscription fees, and applied finance charges and the like. Similarly, the term finance charges should be understood as including, again by way of nonlimiting example, late fees, interest charges, bank fees and all other charges and assessments added to those debts directly incurred by a user through transactions such as purchases and cash advances and the like, such finance charges most commonly resulting from the user's decision to extend an outstanding balance due as of a particular billing period closing date. Furthermore, any general or special purpose credit or bank card or similar or equivalent instrument or mechanism including a pre-paid credit or bank card, whether or not represented or implemented in the form of a physical card or member or the like, through or in accordance with which an authorized user executes a transaction (and thereby incurs debts) with an obligation to repay to the card or instrument issuer or sponsor is intended to be subsumed, for purposes of this disclosure, under the term credit card as used herein.

As used herein, the term "authorized user" is a person named on or to a credit card for which he or she will be periodically billed. Because a corporation and other legally established entities are often referred to as legal persons or entities, such organizations are intended to be included with the scope of "authorized user." As used herein, the terms "credit card service provider" and "service provider" are interchangeable for the purpose of this disclosure and intended to include a financial institution or bank including one or more or any and all participants of the invention including one or more or any and all partners thereof, subsidiaries thereof, agents thereof, intermediates thereof, corporations thereof, legal entities thereof, benefactors thereof, investors thereof, third parties thereof, etc. In sum, any party participating in or otherwise facilitating the implementation of the invention as or on behalf or in conjunction and/or cooperation with the credit card service provider or service provider is intended to be subsumed, for the purpose of this disclosure, under each of the terms "credit card service provider" and "service provider".

In accordance with the principle of the invention, a preferred method includes providing an authorized user of a credit card issued by an issuer, namely, a service provider as herein defined. The service provider and the authorized user are participating members of the method, such as by a contractual agreement for credit card services, which is provided and offered by the service provider as a means to enhance the value of a credit card to enhance the authorized user's perception of the desirability of holding or subscribing to the credit card and to encourage increased use of the credit card for its normal utility as a payment device through which the authorized user incurs debt. In accordance with the principle of the invention, the authorized user refers a customer to the service provider for credit card services, in which the customer submits an application for credit card services, i.e., a credit application, to the service provider as a result of the referral. In one scenario, the service provider provides the authorized user with credit applications for the authorized user to provide to referred customers. In another scenario, the referred customer contacts the service provider at the instruction of the authorized user, whether in person, by phone, by letter or written correspondence, by way of email, etc., requesting a credit application, which, in due course, is then furnished to the referred customer by the service provider. The credit application can be a hard copy, if desired. The credit application can also be electronic, in which it is filled out and submitted, as a matter of example, online, such as through the service provider's web site. Any form of credit application process can be used in accordance with the ordinary and readily available credit card application systems and methods currently in use by most large service providers. The credit application is a typical one requesting personal and financial information and authorization of the service provider to perform a credit check, in which information provided about the customer by the credit application is used by the underwriters of the service provider to determine whether to grant a credit card and if so at what credit limit amount and percentage interest rate.

The service provider receives and processes/underwrites and, in accordance with the method, approves the credit application, and issues a credit card to the referred customer establishing the referred customer as a referred authorized user of a credit card. In granting the referred authorized user credit card services, the service provider may require the payment of a nominal initial fee, i.e., a start-up or initiation fee. In consideration to the authorized user, which can now be considered a referring authorized user, for making a customer referral resulting in the service provider establishing a new referred authorized user of a credit card, in accordance with the principle of the invention, the service provider issues valuable consideration to the referring authorized user.

Preferably, the step of the customer submitting an application for credit card services to the service provider further includes the customer designating in the credit application the authorized user as a referring party or as the referring authorized user. The referring party can be designated by name, social security number, by an account number assigned to the authorized user by the service provider, by a lettered and/or numbered code assigned to the authorized user by the service provider, etc. Credit applications or brochures or marketing cards or other materials can be provided to the referring authorized user pre-printed with the information necessary for permitting referred customers to designated the authorized user as the referring party. For referring authorized users that own or operate a web site, the referring authorized user can use the website as a means of advertising the credit card services of the service provider and the designated referral code or other designation to use, and even a live link to the service provider's web site and this aspect is highly desirable. As a matter of example, the service provider can provide the referring authorized user with a banner add or other electronic add form encoded with or otherwise having the designated referral code or other designation for the referring authorized user. Users accessing the referring authorized user's web site and who subsequently use the designated code as a referral code for credit card services are considered referred customers in accordance with this disclosure. It is within the scope of the invention that the referring authorized user can use any suitable/desired/appropriate manner of marketing the credit card services of the service provider, including on the authorized user's web site.

In one embodiment, the valuable consideration is a monetary payment paid to the referring authorized user by the service provider by way of any suitable payment method, such as by check, wire transfer, etc. The monetary payment can also be delivered as a credit on the credit card account of the referring authorized user or a reduction of debt on the credit card account. In another embodiment, the valuable consideration is a gift such as a gift basket, jewelry, houseware, one or more gift certificate for one or more products and/or services, etc., whether provided by the service provider or by a participating party, vendor, restaurant, retail concern, etc., one or more free products and/or services whether provided by the service provider or other participating party, vendor, restaurant, retail concern, etc. A gift can be delivered to the referring authorized user by or at the behest of the service provider by way of any conventional shipping method. The service provider may require the referring authorized user to pick up the gift at a designated location. Any desired valuable consideration can be provided.

In accordance with the principle of the invention, the valuable consideration is preferably a monetary payment, which can be the same for each customer referred to the service provider by the referring authorized user or different, whether higher or lower as specified by the service provider. As a matter of example, the valuable consider can be $100 for the first referred authorized user established from a customer referral made by the referring authorized user, $200 for the next referred authorized user established from a customer referral made by the referring authorized user, $300 for still the next referred authorized user established from a customer referral made by the referring authorized user, and so on and so forth. Other monetary amounts can be used and in varying increasing or decreasing increments.

The invention further provides the authorized user incurring debt on the credit card, which incurred debt and all account activity of the authorized user's credit card account is managed in accordance with well-established and well-known accounting techniques prosecuted by the service provider or other participating party, partner, accounting firm, etc. For a predetermined amount of debt incurred by the authorized user on the credit card, such as $20, $40, $60, $80, $100, $200, $500, $1,000, etc., or other selected and predetermined amount of incurred debt, the method further includes the service provider submitting an entry into a sweepstakes on behalf of the authorized user, and subsequently conducting a drawing from entries of the sweepstakes, wherein the entry of the authorized user is one of the entries. Although it is preferred that the service provider conduct and/or provide and otherwise implement the sweepstakes, it can be conducted by and/or provided or otherwise implemented by one or more other parties, such as with an independent lottery/sweepstakes. An example of this is the service provider entering the authorized user into a POWERBALL® sweepstakes or the like. The sweepstakes is conventional in nature and is a contest in which a prize, such as a car, a boat, a motorcycle, a house, a monetary prize, etc., is awarded to a winner of a random drawing, which winner can possibly by the authorized user. Delivery of prizes to a designated winner of the sweepstakes is made in a conventional manner in accordance with conventional sweepstakes practice.

The referred authorized user can participate in the foregoing method by referring a customer to the service provider for credit card services, and so on and so forth. An example of this is the referred authorized user, who will now be referred to as a first referred authorized user, referring a second customer to the service provider for credit card services, the second customer submitting an application for credit card services to the service provider, the service provider receiving and processing and approving the application and issuing a credit card to the second customer establishing a second referred authorized user of a credit card, and in consideration therefore to the first referred authorized user the service provider issuing valuable consideration to the first referred authorized user. The step of the second customer submitting an application for credit card services to the service provider further includes the second customer designating the first referred authorized user as a referring party, as previously explained. The invention further provides the second referred authorized user incurring debt on the credit card. For a predetermined amount of debt incurred by the second referred authorized user on the credit card, the method further includes the service provider submitting an entry into a sweepstakes on behalf of the second referred authorized user, and conducting a drawing from entries of the sweepstakes, wherein the entry of the second referred authorized user is one of the entries.

It will be understood that the invention cannot be facilitated if the service provider rejects a credit application of a customer referred by a referring authorized user and refuses to issue a credit card to the referred customer. The exception to this is if the credit card is pre-paid by the referred customer. Accordingly, the use of pre-paid credit cards is intended to be within the scope of the invention, and this aspect was intimated supra.

Consistent with the foregoing teachings, the invention contemplates associated embodiments. And so in another aspect of the invention, a method includes providing an authorized user of a credit card issued by a service provider as explained supra, the authorized user referring a plurality of customers to the service provider for credit card services, the customers submitting applications for credit card services to the service provider, the service provider receiving and processing and approving the applications and issuing credit cards to the customers establishing a plurality of referred authorized users of credit cards, and in consideration therefore to the authorized user, the service provider issuing valuable consideration to the authorized user. The required plurality of referred authorized users needed to be established from customer referrals in order for the service provider to issue valuable consideration to the referring authorized user can be any number such as two, five, ten, twenty, etc. The customers submitting applications for credit card services to the service provider further includes the customers designating the authorized user as a referring party or referring authorized user, as previously explained. The valuable consideration is a monetary payment. In another embodiment, the valuable consideration is as gift as previously explained. The invention further provides the referring authorized user incurring debt on the credit card. For a predetermined amount of debt incurred by the referring authorized user on the credit card, the method further includes the service provider submitting an entry into a sweepstakes on behalf of the referring authorized user, and conducting a drawing from entries of the sweepstakes, wherein the entry of the authorized user is one of the entries. As previously explained, although it is preferred that the service provider conduct and/or provide and otherwise implement the sweepstakes, it can be conducted by and/or provided or otherwise implemented by one or more other parties, such as with an independent lottery/sweepstakes. The referred authorized users of this embodiment can participate in the foregoing method by referring customers to the service provider for credit card services as explained above, and so on and so forth.

In yet another aspect, the invention includes providing an authorized user of a credit card issued by a service provider, the authorized user referring customers to the service provider for credit card services, the customers submitting applications for credit card services to the service provider, the service provider receiving and processing and approving the applications and issuing credit cards to the customers establishing referred authorized users of credit cards, and in consideration therefore to the authorized user, the service provider issuing valuable consideration to the authorized user for every predetermined number of or set of referred authorized users of credit cards. The customers submitting applications for credit card services to the service provider further includes the customers designating the authorized user as a referring party or referring authorized user, as previously explained. The required number of for each set of referred authorized users needed to be established from customer referrals in order for the service provider to issue valuable consideration to the referring authorized user can be any number such as ten, twenty, thirty, etc. As a matter of example, the service provider issues valuable consideration to the referring authorized user for every ten referred authorized users resulting from customer referrals made by the referring authorized user, and so on and so forth. It can be some other number of established referred authorized users or varying numbers as may be desired, and the value of the valuable consideration issued to the referring authorized user for every predetermined set of referred authorized users resulting from customer referrals made by the referring authorized user can decrease or increase.

In accordance with the immediate embodiment, the valuable consideration is a monetary payment. In another embodiment, the valuable consideration is as gif as previously explained. It is preferred that the valuable consideration by a monetary payment. As a matter of example, the valuable consideration can be $100 for every ten referred authorized users established from customer referrals made by the referring authorized user, $200 for the next ten referred authorized users established from customer referrals made by the referring authorized user, $300 for still the ten next referred authorized users established from customer referrals made by the referring authorized user, and so on and so forth. Other monetary amounts can be used and in varying increasing or decreasing increments.

In accordance with the immediate embodiment, the invention further provides the referring authorized user incurring debt on the credit card. For a predetermined amount of debt incurred by the referring authorized user on the credit card, the method further includes the service provider submitting an entry into a sweepstakes on behalf of the authorized user, and conducting a drawing from entries of the sweepstakes, wherein the entry of the authorized user is one of the entries. As previously explained, although it is preferred that the service provider conduct and/or provide and otherwise implement the sweepstakes, it can be conducted by and/or provided or otherwise implemented by one or more other parties, such as with an independent lottery/sweepstakes. The referred authorized users of this embodiment can participate in the foregoing method by referring customers to the service provider for credit card services as explained above, and so on and so forth.

The present invention allows referring authorized users to earn income or to receive gifts or other valuable consideration from a service provider for referring customers to a service provider, and is described above with reference to preferred embodiments, and to participate in sweepstakes/lotteries by incurring debt on their credit cards. Those skilled in the art will recognize that changes and modifications may be made in the described embodiments without departing from the nature and scope of the present invention. For instance, although monetary amounts discussed in this specification are expressed in dollars, any legal currency can be used.

Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A method comprising steps of:
   providing an authorized user of a credit card issued by a service provider;
   the authorized user referring a first customer to the service provider for credit card services;
   the first customer submitting an application for credit card services to the service provider;
   the service provider receiving, processing and approving the application and issuing a credit card to the first customer establishing a first referred authorized user of a credit card; and in consideration therefore to the authorized user
   the service provider issuing valuable consideration to the authorized user;
   the authorized user incurring debt on the credit card; and
   for a predetermined amount of a debt incurred by the authorized user on the credit card, the service provider submitting an entry into a sweepstakes on behalf of the authorized user.

2. The method of claim 1, wherein the step of the first customer submitting an application for credit card services to the service provider further includes the first customer designating the authorized user as a referring party.

3. The method of claim 1, further comprising conducting a drawing from entries of the sweepstakes, wherein the entry of the authorized user is one of the entries.

4. The method of claim 1, further comprising:
   the first referred authorized user referring a second customer to the service provider for credit card services;
   the second customer submitting an application for credit card services to the service provider;
   the service provider receiving, processing and approving the application and issuing a credit card to the second customer establishing a second referred authorized user of a credit card; and in consideration therefore to the first referred authorized user
   the service provider issuing valuable consideration to the first referred authorized user.

5. The method of claim 4, wherein the step of the second customer submitting an application for credit card services to the service provider further includes the second customer designating the first referred authorized user as a referring party.

6. The method of claim 5, further comprising:
   the first referred authorized user incurring debt on the credit card; and
   for a predetermined amount of debt incurred by the first referred authorized user on the credit card, the service provider submitting an entry into a sweepstakes on behalf of the first referred authorized user.

7. The method of claim 6, further comprising conducting a drawing from entries of the sweepstakes, wherein the entry of the first referred authorized user is one of the entries.

8. A method comprising steps of:
   providing an authorized user of a credit card issued by a service provider;
   the authorized user referring customers to the service provider for credit card services;
   the customers submitting applications for credit card services to the service provider;
   the service provider receiving, processing and approving the applications and issuing credit cards to the customers; in consideration therefore to the authorized user
   the service provider issuing valuable consideration to the authorized user;
   the authorized user incurring debt on the credit card; and
   for a predetermined amount of debt incurred by the authorized user on the credit card, the service provider submitting an entry into a sweepstakes on behalf of the authorized user.

9. The method of claim 8, wherein the valuable consideration comprises a monetary payment.

10. The method of claim 8, wherein the valuable consideration comprises a gift.

11. The method of claim 8, wherein the step of the customers submitting applications for credit card services to the service provider further includes the customers designating the authorized user as a referring party.

12. The method of claim 8, further comprising the service provider conducting a drawing from entries of the sweepstakes, wherein the entry of the authorized user is one of the entries.

13. A method comprising steps of:
   providing an authorized user of a credit card issued by a service provider;
   the authorized user referring customers to the service provider for credit card services;

the customers submitting applications for credit card services to the service provider;

the service provider receiving, processing and approving the applications and issuing credit cards to the customers establishing referred authorized users of credit cards; and in consideration therefore to the authorized user the service provider issuing valuable consideration to the authorized user for every predetermined number of referred authorized users of credit cards;

the authorized user incurring debt on the credit card; and for a predetermined amount of debt incurred by the authorized user on the credit card, the service provider submitting an entry into a sweepstakes on behalf of the authorized user.

14. The method of claim 13, wherein the step of the customers submitting applications for credit card services to the service provider further includes the customers designating the authorized user as a referring party.

15. The method of claim 13, wherein the valuable consideration comprises a monetary payment.

16. The method of claim 13, wherein the valuable consideration comprises a gift.

17. The method of claim 13, further comprising the service provider conducting a drawing from entries of the sweepstakes, wherein the entry of the authorized user is one of the entries.

* * * * *